(12) United States Patent
Ishikawa et al.

(10) Patent No.: US 6,215,225 B1
(45) Date of Patent: Apr. 10, 2001

(54) NON-DIRECTIONAL TOUCH SIGNAL PROBE

(75) Inventors: Nobuhiro Ishikawa, Ushiku; Kunitoshi Nishimura, Machida, both of (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 09/171,194
(22) PCT Filed: Feb. 16, 1998
(86) PCT No.: PCT/JP98/00613
§ 371 Date: Oct. 14, 1998
§ 102(e) Date: Oct. 14, 1998
(87) PCT Pub. No.: WO98/36241
PCT Pub. Date: Aug. 20, 1998

(30) Foreign Application Priority Data

Feb. 17, 1997 (JP) .................................................. 9-032149
Jul. 29, 1997 (JP) .................................................. 9-203110

(51) Int. Cl.[7] .................................................. H01L 41/08
(52) U.S. Cl. .......................... 310/319; 310/328; 310/338
(58) Field of Search .................................. 310/319, 338, 310/339, 328

(56) References Cited

U.S. PATENT DOCUMENTS

| 4,177,568 | 12/1979 | Werner et al. ..................... 33/174 L |
| 4,339,011 | * 7/1982 | DiMarzio ............................. 177/177 |
| 4,709,342 | * 11/1987 | Hosoda et al. ....................... 364/558 |
| 5,010,773 | * 4/1991 | Lorenz et al. ..................... 73/862.04 |
| 5,732,289 | * 3/1998 | Tsukahara et al. ..................... 396/50 |

FOREIGN PATENT DOCUMENTS

| 2006435B | 9/1982 | (GB) . |
| 8327308 | 12/1996 | (JP) . |

* cited by examiner

Primary Examiner—Thomas M. Dougherty
(74) Attorney, Agent, or Firm—Webb Ziesenheim Logsdon Orkin & Hanson, P.C.

(57) ABSTRACT

A stylus has a piezoelectric element support part to support and fix piezoelectric elements. The piezoelectric element support part is a regular polygonal body and its cross section orthogonal to the axis of the stylus is made a regular polygon. The piezoelectric elements are mounted on each side surface of the regular polygonal body, respectively. Sums and difference signals outputted from the piezoelectric elements are produced and a touch detection signal is generated based on the produced signals.

13 Claims, 16 Drawing Sheets

NON-DIRECTIONAL TOUCH SIGNAL PROBE

BACKGROUND OF THE INVENTION

1. Technical Field

The present invention relates to a non-directional touch signal probe to be used to measure the shape of an object with a coordinate measuring machine.

2. Background Art

A coordinate measuring machine is known as a measuring instrument to measure shape, size, or the like of an object. In order to perform coordinate detection or position detection, the measuring instrument is provided with a touch signal probe wherein a touching part is provided at a top end portion of a stylus. The touching part is used to detect touching of the object.

For a touch signal probe, in a conventional example, a stylus is provided with a detecting element, such as a piezoelectric element. When a touching part at a top end portion of the stylus touches an object to be measured, impact is detected and the touch detection is performed. This conventional example is advantageous in that the configuration is relatively simple, but disadvantageous in that the sensitivity is different depending on the direction from which the touching part approaches the object. That is, it has the direction dependent property.

Conventional examples of such touch signal probes are disclosed in Japanese Patent Publication No. 60-48681 (corresponding to U.S. Pat. No. 4,177,568) (conventional example 1); Japanese Patent Laid-Open No. 54-78164 (corresponding to GB 2006435B) (conventional example 2); and Japanese Patent Laid-Open No. 8-327308 (conventional example 3).

In the conventional example 1, a measuring head or a measuring probe comprises a movable part and a stationary part, and these parts are connected to each other through a seat mechanism.

The movable part is constituted by two members divided in two. A detecting element (piezoelectric element) responding to tension and compression at high sensitivity is provided between these members.

In the conventional example 2, (a) a piezoelectric element is assembled in a part of a stylus, or (b) a stylus is divided in two and a piezoelectric element is grasped between the divided parts of the stylus, or (c) a piezoelectric element is assembled (or installed) to a touching ball provided at a top end portion of a stylus and the piezoelectric element is grasped in a connection part between a touching ball and a stylus.

In the conventional example 3, a stylus is mounted at the center of a disk-shaped substrate, and a plurality of piezoelectric elements are arranged in radial position around the stylus. In order to detect that the stylus touches the object, the sum of absolute values of signals outputted from respective piezoelectric elements is detected.

In the conventional examples 1 and 2, various cases are disclosed such that one piezoelectric element is installed or a plurality of piezoelectric elements are installed.

In general, when few piezoelectric elements are used, since the structure of a stylus is simple and the assembly is easy, an advantage exists in that the cost can be made low. But the detection accuracy is not sufficient and the direction dependent property exists.

On the contrary, when a plurality of piezoelectric elements (detecting elements) are used, although the direction dependent property becomes small by reason of combining these elements, a disadvantage exists in that the structure is complicated.

As used herein, the "direction dependent property" means the degree of difference in the response of a detecting element depending on the location of the touching portion of a touching ball at a top end portion of a stylus when the touching ball touches the object. In the conventional example 1, although the detecting elements are separated for detecting the X-axis and for detecting the Y-axis, the direction dependent property is not further considered. Consequently, improvement of the direction dependent property is not sufficient. Also, in the conventional example 2, the relation between the direction dependent property and the arrangement of the piezoelectric elements is not considered.

In the conventional example 3, the sum of absolute values of signals outputted from a plurality of piezoelectric elements is combined and a detection signal is fetched so that the directional property in the detection sensitivity is not produced when the top end portion of the stylus touches the object. However, when it touches the object from a direction orthogonal to the stylus axis, the improvement of the direction dependent property of the detection sensitivity is not sufficient. Also, the conventional example 3 does not address the case of touching from the stylus axis direction.

When coordinate detection or position detection is performed using a touch signal probe, exchanging a stylus is usually performed. In a conventional touch signal probe, however, the case of the stylus being fixed is assumed, but the case of the stylus being exchanged is not assumed.

SUMMARY OF THE INVENTION

An object of the present invention is to provide a touch signal probe which is simple in structure and does not have the direction dependent property.

Another object of the present invention is to provide a touch signal probe which does not have the direction dependent property whatever stylus is installed.

Therefore, the present invention intends to attain the foregoing object in that a touch detection signal is generated based on the sum, difference or square of signals outputted from detecting elements (for example, piezoelectric elements or strain gauges) mounted on a side surface of a support part having a regular polygonal body.

More specifically, a touch signal probe according to the present invention comprises a pole-shaped stylus with its top end portion having a touching part for touching an object to be measured and detecting elements arranged on the stylus for detecting that the touching part touches the object. The stylus has a detecting element support part for supporting and fixing the detecting elements. The detecting element support part has a regular polygonal body (having a cross section of a regular polygon orthogonal to the stylus axis). The detecting elements are mounted on at least two surfaces among respective side surfaces of the regular polygonal body. Signals outputted from the detecting elements are processed, and a touch detection signal is generated based on the results of processing, such as summing, taking the difference, finding a product by constant and delaying of the signals or combination thereof.

When a touch signal probe of the present invention is moved and a touching part of a stylus touches an object, impact force at the touching state is detected by detecting elements. In this case, a detection signal is outputted from each detecting element, and at first, signals comprising the sum and difference of signals outputted from each detecting element are produced, respectively. The sum of signals outputted from each detecting element is produced in order that the bending strain component acting on the stylus axis is removed and the longitudinal strain component acting in the stylus axis direction is obtained. The difference of signals outputted from each detecting element is produced in order that the bending strain component acting on the stylus axis is obtained from signals outputted from each detecting element and being different in phase.

Subsequently, signals comprising the squares of the sum signals and difference signals are produced, respectively. Each signal is squared in order that the maximal value of signals outputted from each detecting element is made completely constant irrespective of the angle between mounting orientation of the detecting element and touching orientation with the object. Further, the square of the sum of each signal is taken to provide a large detection signal such that the measurement precision can be improved.

A touch detection signal is generated based on the signal produced from the sum of squared signals, for example, and coordinates in the point with the touch detection signal generated therein are read as a measured value.

Accordingly, in the present invention, signals outputted from each detecting element are processed and thereby the direction dependent property is eliminated and the measurement can be performed with high precision.

Further, since the detecting elements are mounted on side surfaces of a regular polygonal body, the structure of a touch signal probe can be made simple.

In the present invention, the cross section of the detecting element support part may be made square and the four detecting elements may be mounted, one on each side surface of the detecting element support part. In this case, a touch detection signal may be generated from two difference signals outputted from two detecting elements among these four detecting elements positioned on opposite sides from each other with respect to the detecting element support part and from sum signals outputted from all four detecting elements or from sum signals outputted from two detecting elements positioned on opposite sides of the support part from each other.

In this embodiment, since the touch detection signals are generated based on signals outputted from four detecting elements arranged in spacing of 90 degrees from each other with respect to the stylus axis, the measurement can be performed with high precision.

Further, the first detection signal may be produced from the sum of the squares of the two difference signals outputted from two sets of detecting elements positioned in relation of the front and rear sides as above described, and the second detection signal may be produced from the sum of signals outputted from all four detecting elements or from the sum of signals outputted from the two detecting elements positioned on opposite sides. The second detection signal is delayed by a prescribed time and then the touch detection signal is generated from the first detection signal and/or the delayed second detection signal.

In this embodiment, when the touch detection signal is produced from the first detection signal and/or the second detection signal, the second detection signal forming the maximal value early in the time is delayed by a prescribed time thereby the same touch detection signal is generated irrespective of the touch position of the touching ball.

Also, the first detection signal may be produced when the sum of the squares of the two difference signals outputted from two sets of detecting elements positioned in relation of the front and rear sides as above described exceeds a reference value, and the second detection signal may be produced when the sum signal outputted from all four piezoelectric elements or the sum signal outputted from the two detecting elements positioned on opposite sides exceeds a reference value.

In this embodiment, in similar manner to the preceding description, the same output is generated irrespective of the touch position of the touching part.

Sum signals outputted from all detecting elements (or sum signals from the two detecting elements positioned in relation on the front and rear sides) are adjusted in amplitude and delayed by a prescribed amount thereby one signal is obtained. Two difference signals are outputted from the detecting elements on opposite sides. The three signals are squared and then summed, respectively' and a touch detection signal may be generated using the processed signal of the three signals.

The present invention intends to attain the foregoing objects in that the time difference between the first detection signal corresponding to the longitudinal strain component and the second detection signal corresponding to the lateral strain component is determined, and the time difference is corrected.

More specifically, a touch signal probe according to the present invention comprises a pole-shaped stylus with its top end portion having a touching part touching an object to be measured, and a plurality of detecting elements arranged on the stylus for detecting that the touching part touches the object. The sum, difference and sum of squares of signals outputted from these detecting elements are produced thereby a signal corresponding to the longitudinal strain component along the axial direction of the stylus and a signal corresponding to the lateral strain component along the orthogonal direction to the axial direction of the stylus are generated. A first detection signal is generated from the signal corresponding to the longitudinal strain component and a second detection signal is generated from the signal corresponding to the lateral strain component. A contact detection signal is generated from either the first detection signal or the second detection signal. A delay time measuring circuit for measuring the time difference between the time of generating the first detection signal and the time of generating the second detection signal is provided. A delay circuit for delaying the first detection signal by the delay time is provided when either the first detection signal or the second detection signal is determined. The time difference measuring circuit performs the delay time setting operation for setting the delay time for the delay circuit every time the stylus is exchanged.

When a touch signal probe of the present invention is moved and a touching part of a stylus touches an object, impact force at the touching state is detected by detecting elements. In this case, a detection signal is outputted from each detecting element, and at first, the sum and difference of signals outputted from each detecting element are produced, respectively. The sum of signals outputted from each detecting element is produced in order that the bending strain component acting on the stylus axis is removed and the longitudinal strain component acting on the stylus axis is obtained. The difference of signals outputted from each detecting element is produced in order that the lateral strain component acting on the stylus axis is obtained from the signals outputted from each detecting element being different in phase.

Subsequently, the sum of the squares are produced from the difference signals. The sum of the squares of each difference signal is produced in order that the maximal value of signals is made constant irrespective of the angle between the mounting orientation of the detecting element and the touching orientation with the object. Further, a large detection signal can be obtained and the measurement precision can be improved.

Based on the signals produced from the sum of squares, a first detection signal is produced corresponding to the longitudinal strain component along the axial direction of the stylus. A second detection signal is produced corresponding to the lateral strain component along the orthogonal direction to the axial direction of the stylus, respectively. A touch detection signal is generated from the first detection signal and/or the second detection signal.

When the touch detection signal is generated, the first detection signal forming the maximal value early in the time is delayed by prescribed time difference Δt by the delay circuit thereby the same touch detection signal is generated irrespective of the touching position of the touching part.

According to an embodiment of the present invention, before the measurement of an object, the touching part of the installed stylus is made to touch an object to be measured at a prescribed angle, for example, 45 degrees, and the time difference Δt between the time of generating the first detection signal and the time of generating the second detection signal is measured by the time difference measuring circuit.

Thus, even if the shape of the installed stylus is varied, since the time difference Δt between the first detection signal and the second detection signal is corrected for each stylus, the direction dependent property is eliminated and the measurement can be performed with high precision.

In the present invention, the time difference measuring circuit may be provided with a flip-flop circuit which outputs an output signal while the first detection signal is generated and until the second detection signal is generated. A time measuring circuit counts the time of outputting the output signal from the flip-flop circuit and produces the time difference.

In this embodiment, the time difference t between the first detection signal and the second detection signal of the installed stylus is determined by the flip-flop circuit and the time measuring circuit, and after measuring the time difference Δt, the usual measurement is performed.

BRIEF DESCRIPTION OF THE DRAWINGS

FIGS. 1A and 1B show a touch signal probe according to a first embodiment of the present invention, wherein FIG. 1A is a perspective view showing the probe before piezoelectric elements are mounted and FIG. 1B is a perspective view showing the probe after piezoelectric elements are mounted;

FIGS. 14A and 14B show a touch probe which is a modification of the present invention (an example of the shape of a piezoelectric element support part being different), wherein FIG. 14A is a perspective view showing the probe before piezoelectric elements are mounted and FIG. 14B is a perspective view showing the probe after piezoelectric elements are mounted;

FIGS. 15A and 15B show a touch probe which is a modification of the present invention (an example of the number of piezoelectric elements being different), wherein FIG. 15A is a perspective view showing the probe before the piezoelectric elements are mounted and FIG. 15B is a perspective view showing the probe after the piezoelectric elements are mounted;

DESCRIPTION OF THE PREFERRED EMBODIMENTS

The embodiments of the present invention will hereunder be described in detail with reference to the accompanying drawings.

Figure 1A:
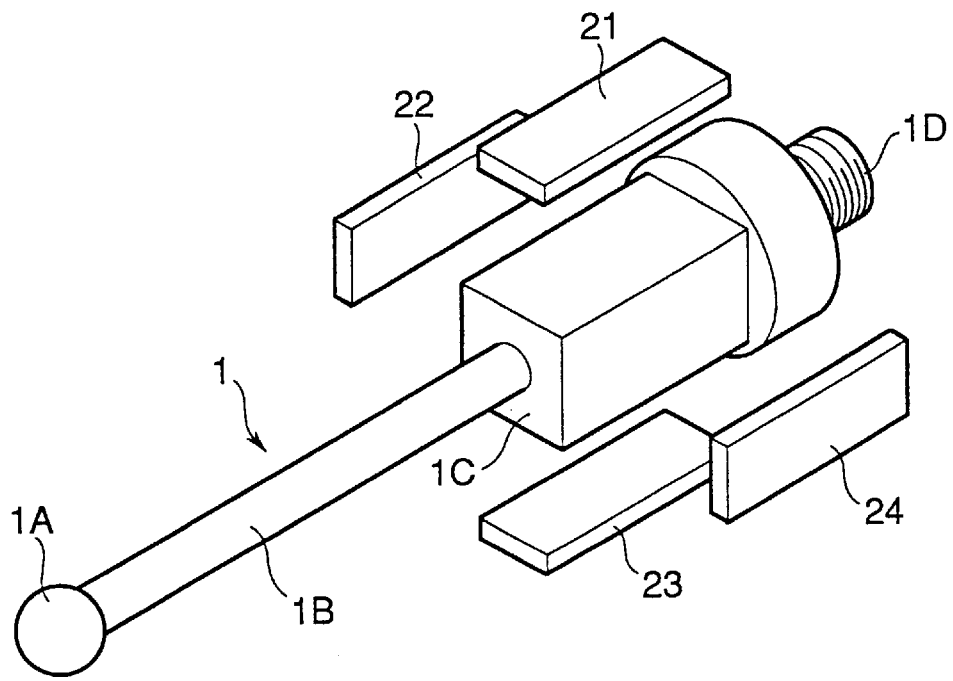
Figure 1B:
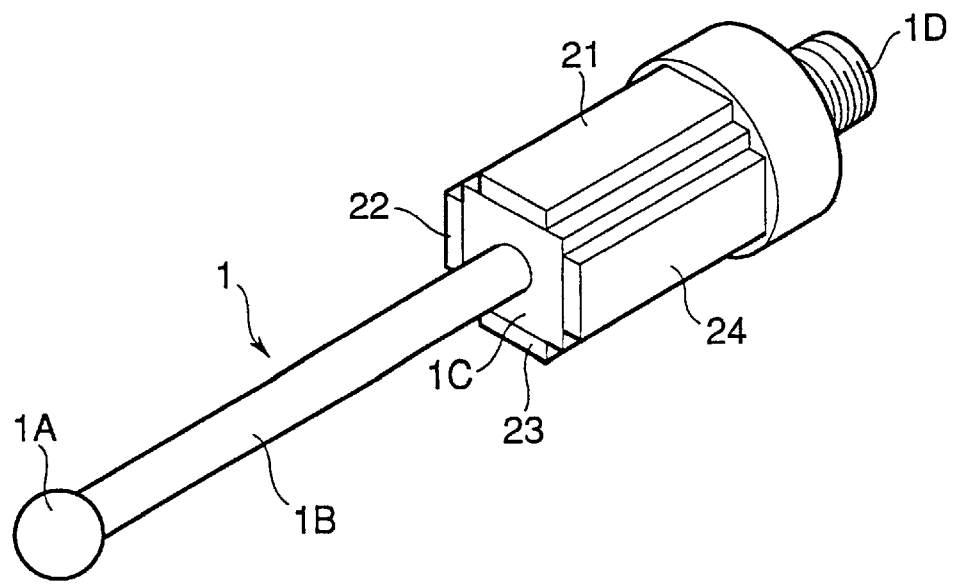

FIGS. 1A and 1B show the whole configuration of a touch signal probe according to a first embodiment of the present invention, and FIG. 1A shows the state before the piezoelectric elements are mounted, and FIG. 1B shows the state after the piezoelectric elements are mounted.

In FIG. 1A, a touch signal probe in this embodiment comprises a pole-shaped stylus 1 having a touching ball 1A for touching an object to be measured at a top end portion and four piezoelectric elements 21~24 mounted on the stylus 1. The stylus 1 comprises the touching ball 1A, a stylus body 1B with circular cross section on one end portion of which the touching ball 1A is mounted, a piezoelectric element support part 1C formed integrally with the other end portion of the stylus body 1B, and a threaded part 1D provided on the end portion of the piezoelectric element support part 1C and arranged to be installed to a probe body (not shown). These members are arranged on the stylus axis.

The piezoelectric element support part 1C is a rectangular parallelepiped with cross section being square and orthogonal to the stylus axis, and the piezoelectric elements 21~24 are fixed to each side surface of the rectangular parallelepiped by an adhesive or the like on the whole surface.

Among these, the piezoelectric elements 21, 23 are in relation of the front and rear sides to each other with respect to the piezoelectric element support part 1C (i.e., on opposite sides of the support part from each other), and the piezoelectric elements 22, 24 are on opposite sides from each other in the position adjacent to the piezoelectric elements 21, 23.

As shown in FIG. 1B, the piezoelectric elements 21~24 are in plane, rectangular form with the longitudinal direction in parallel to the stylus axis.

Figure 2A:
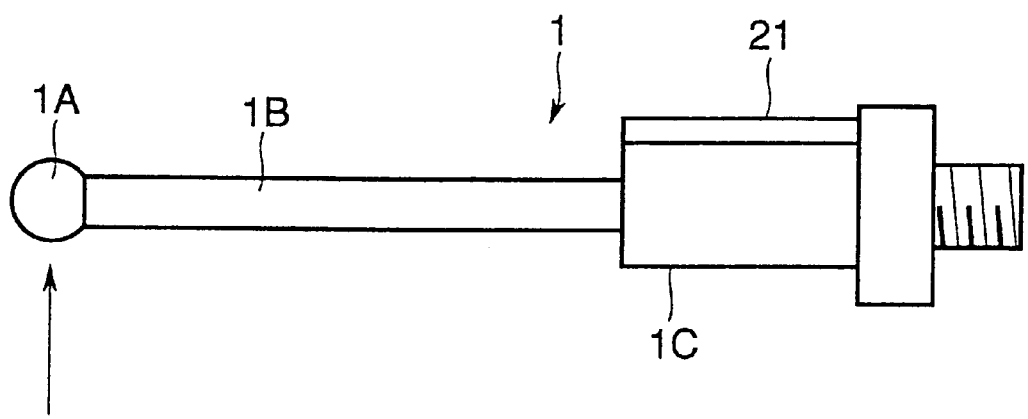
FIG. 2A is a front view showing the case wherein the touching part of a touch signal probe touches an object to be measured from the direction orthogonal to the stylus axis.
Figure 2B:
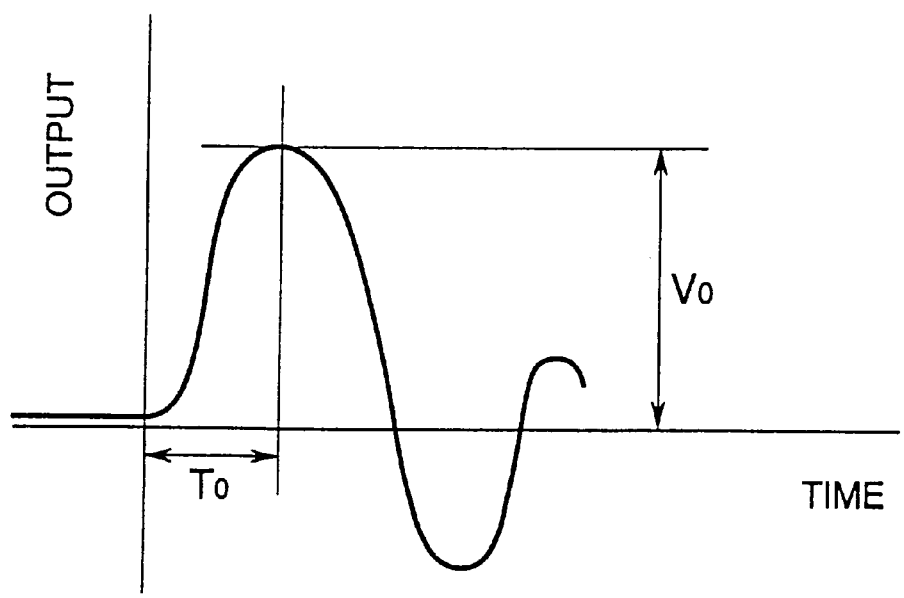
FIG. 2B is a graph showing variation with time of output of one piezoelectric element in the case of FIG. 2A.

FIG. 2A is a front view showing the case that the touching ball 1A of the touch signal probe touches an object to be measured from the direction orthogonal to the stylus axis, and FIG. 2B is a graph showing variation with the time of output of one piezoelectric element 21 in the case of FIG. 2A.

In FIG. 2B, after touching the object to be measured, at the timing determined by the natural frequency of the stylus 1 or the like, the output of the piezoelectric element 21 becomes the maximal value $V_o$.

Figure 3:
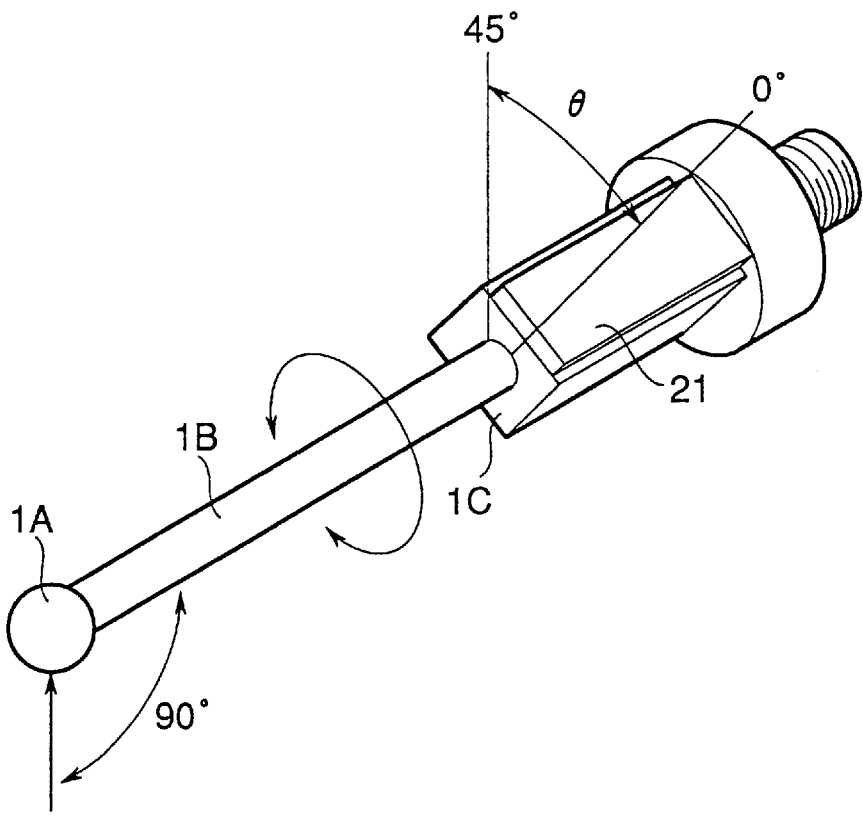
FIG. 3 is a perspective view of a touch signal probe explaining angle Θ between the mounting direction of a piezoelectric element and the direction of a stylus touching an object to be measured.
Figure 4:
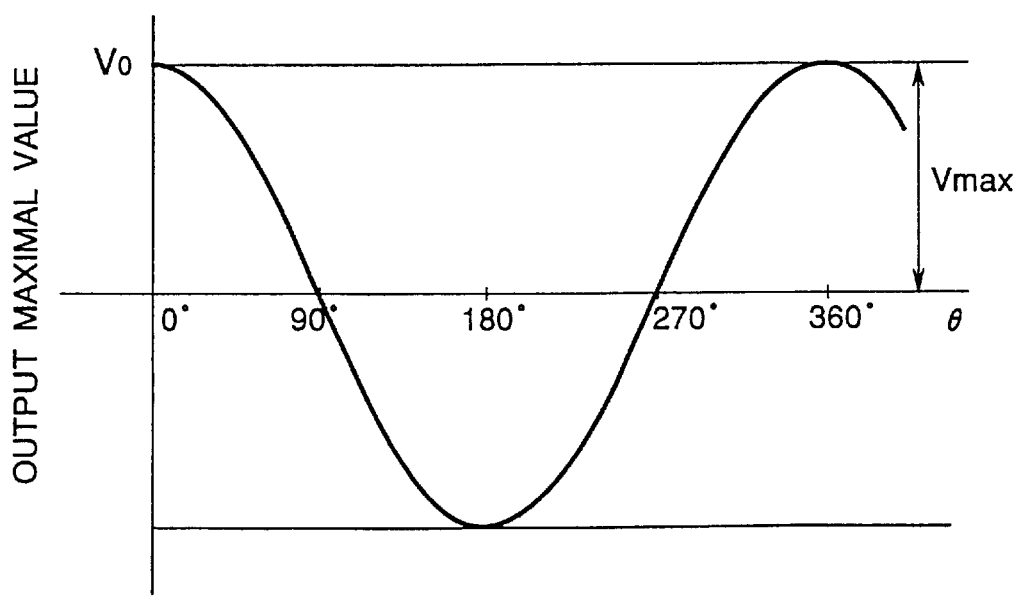
FIG. 4 is a graph showing the relation of the angle Θ and output maximal value $V_o$ of a piezoelectric element.

The amount of the maximal value $V_o$ is different depending on the angle between the mounting direction of the piezoelectric element 21 and the direction of the stylus 1 touching the object to be measured, that is, the angle $\Theta$ of the piezoelectric element 21 around the axis of the stylus 1 (refer to FIG. 3), and varies in sinusoidal form in the period of 360 degrees as shown in FIG. 4. It is seen that the output maximal value $V_o$ becomes the maximum $V_{max}$ when the stylus 1 touches the object to be measured at the angle of the piezoelectric element 21 causing bending deformation ($\Theta=0$).

First Embodiment

Figure 5:
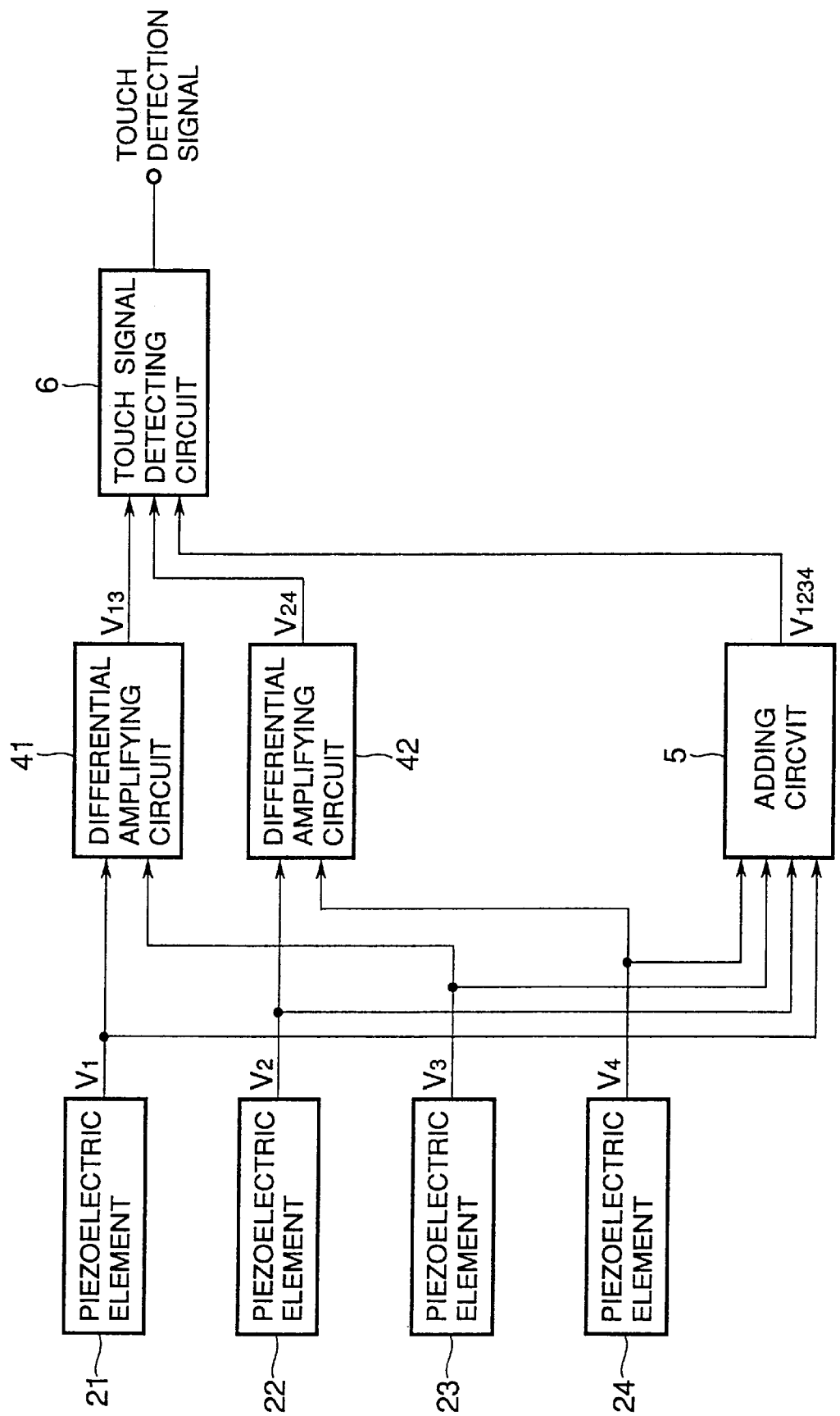
FIG. 5 is a block diagram showing the flow of information for producing a touch signal from signals outputted from the piezoelectric elements.
Figure 6:
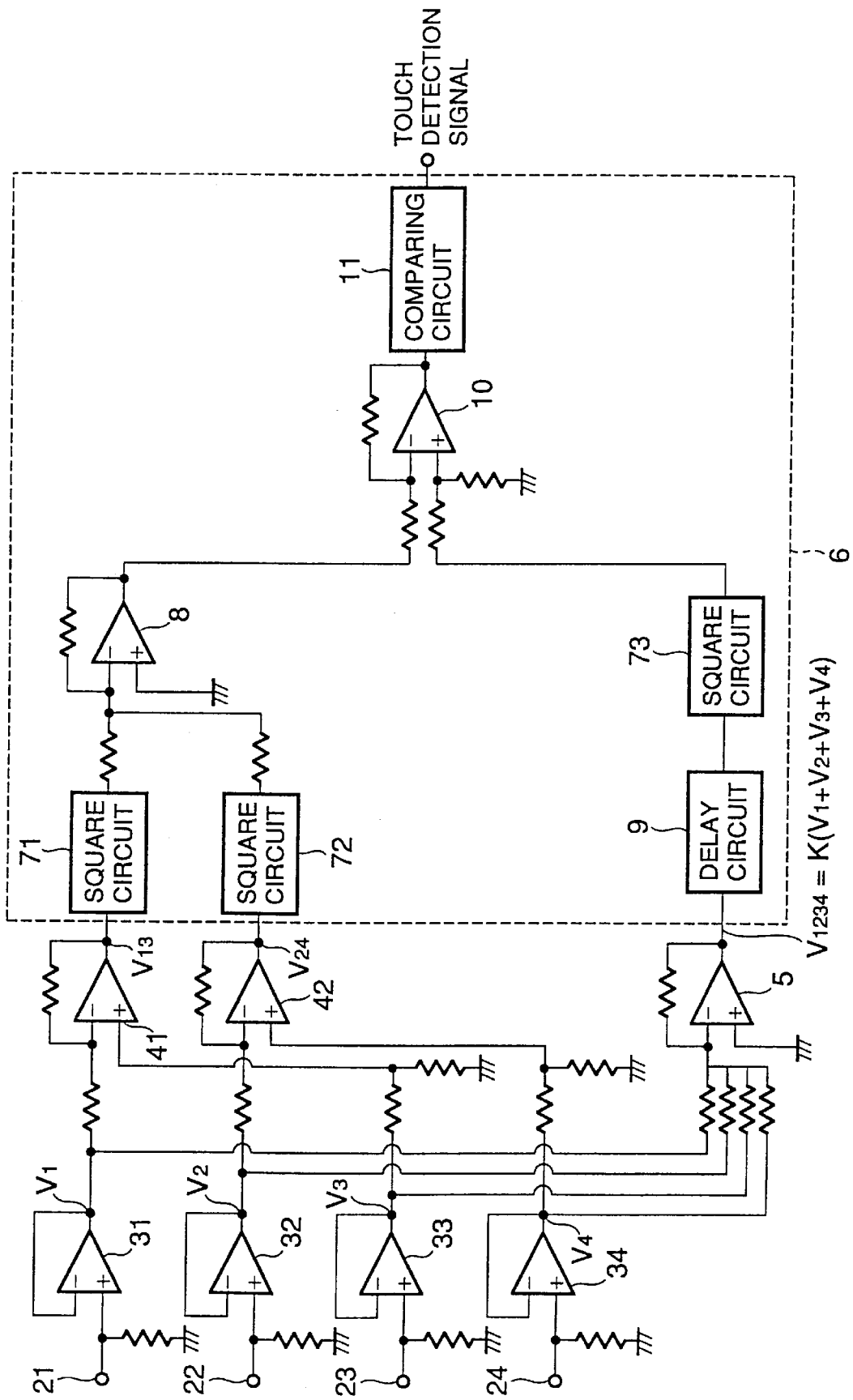
FIG. 6 is a circuit diagram showing a circuit for producing a touch signal from signal outputted from the piezoelectric elements.

FIG. 5 is a block diagram showing information flow for producing a touch detection signal by outputs from the four piezoelectric elements 21~24, and FIG. 6 is a circuit diagram thereof.

In FIGS. 5 and 6, signals outputted from each of the piezoelectric elements 21~24 are amplified in amplifying circuits 31~34 and made $V_1$~$V_4$, and then the difference $V_{13}$ of the signals $V_1$, $V_3$ from the piezoelectric elements 21, 23 on opposite sides from each other is provided by a differential amplifying circuit 41 , and difference $V_{24}$ of the signals $V_2$, $V_4$ outputted from the piezoelectric elements 22, 24 on opposite sides from each other is produced by a differential amplifying circuit 42. A first touch detection signal is produced in these differential amplifying circuits 41, 42.

Further, sum $V_{1234}$ of the signals $V_1$~$V_4$ outputted from the piezoelectric elements 21~24 and amplified in the amplifying circuits 31~34 is produced by an adding circuit 5, and a second touch detection signal is produced in the adding circuit 5.

Here, the difference $V_{13}$ ($V_{24}$) of the output signals of the piezoelectric elements 21, 23 (22, 24) is produced, since the output signals from the piezoelectric elements 21, 23 (22, 24) being different in the mounting angle by 180 degrees with respect to the stylus axis are different in the phase by 180 degrees, it is intended that the difference is produced thereby the bending strain component acting on the stylus axis is obtained without attenuation.

Also, the sum $V_{1234}$ of the four piezoelectric elements 21~24 is produced in order that the bending strain component acting on the stylus axis is removed and the longitudinal strain component acting in the stylus axis direction is obtained. In this embodiment, however, when the longitudinal strain component is obtained, the operation is not limited to obtaining the sum of the output signals of all four piezoelectric elements 21~24, but the sum of the output signals from the two piezoelectric elements 21, 23 or the two piezoelectric elements 22, 24 being on opposite sides from each other may be produced.

A touch detection signal is produced by the touch signal detecting circuit 6 from the first touch signal produced in the differential amplifying circuits 41, 42 and the second touch signal produced in the adding circuit 5.

In the touch signal detecting circuit 6, the differences ($V_{13}$, $V_{24}$) of the output signals being the first touch signal are squared in the squaring circuits 71, 72, respectively, and then added in an adding circuit 8 and become one signal. Here, the signals are squared and added in order that the maximum of outputs from the piezoelectric elements 21, 23 (22, 24) being different in the mounting angle by 90 degrees is made constant irrespective of the angle $\Theta$.

That is, if the maximal value of the difference output of the piezoelectric elements 21, 23 is expressed by $$V_{13}=V_{max}\times\cos(\Theta_0)$$

and the maximal value of the difference output of the piezoelectric elements 22, 24 is expressed by $$V_{24}=V_{max}\times\cos(\Theta_0+90)$$

since $$(V_{13})^2+(V_{24})^2=(V_{max})^2$$

the maximal value of the output in the timing $T_o$ becomes $(V_{max})^2$ irrespective of the angle $\Theta_0$.

Figure 7:
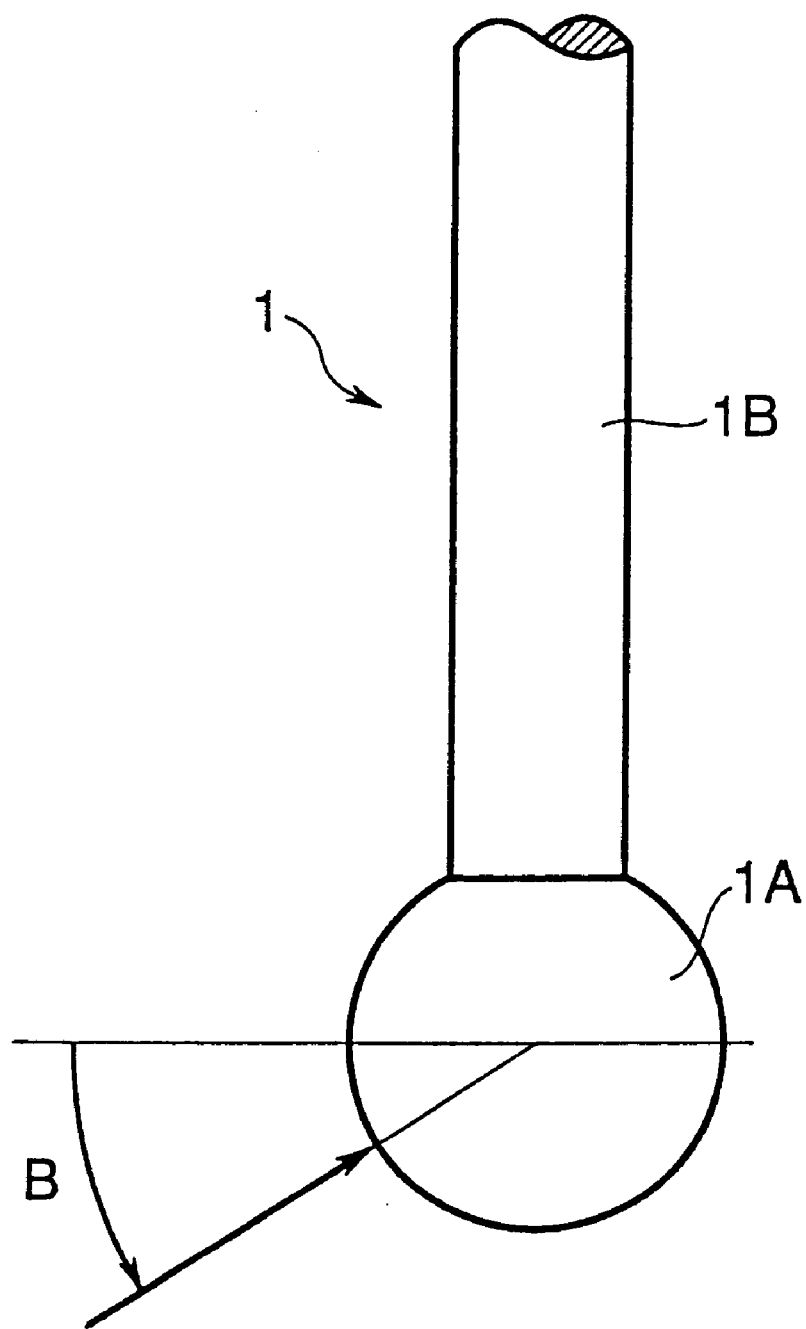
FIG. 7 is a perspective view of a stylus explaining angle β between the direction orthogonal to the stylus axis and the direction of a touching part touching an object to be measured.

The above description pertains to the case where the object to be measured touches the touching ball 1A from the direction orthogonal to the stylus axis of the stylus 1. In the case of touching at angle $\beta$ to the stylus axis (refer to FIG. 7), the maximal value of the output becomes $\{V_{max}\times\cos\beta\}^2$. In addition, the angle $\beta$ in FIG. 7 is the angle between the direction orthogonal to the stylus axis and the direction of the touching ball 1A touching the object to be measured.

Since the first touch signal $V_{13}$ ($V_{24}$) is the difference signal of the piezoelectric elements 21, 23 (22, 24) applied to opposite sides with respect to the stylus axis, $V_{max}\times\cos\beta$ may be said to be a signal representing the bending strain component of the piezoelectric element support part 1C.

In FIG. 6, if K is assumed to be an amplification factor (constant), the sum signal $V_{1234}$ produced by the adding circuit 5 is determined by following formula.

$$V_{1234}=K(V_1+V_2+V_3+V_4)$$

$V_{1234}$ is a signal representing the longitudinal strain component removing the bending strain component. When $\beta$ is 90 degrees, that is, when the touching ball 1A touches the object to be measured from the direction of the stylus axis, $V_{1234}$ becomes the maximum $V_M$. In the case of touching at the angle β (see FIG. 7) to the stylus axis, the maximal value of the output $V_{1234}$ becomes $$V_{1234} = V_M \times \text{SIN } \beta$$

However, in general, the time of forming the maximal value of $\{V_{max} \times \text{COS } \beta\}^2$ and the time of forming the maximal value of $V_{1234}$ are different. That is, since the longitudinal rigidity is higher than the bending rigidity generally, $V_{1234}$ is earlier in the time.

Consequently, gains of the adding circuit 5 and the differential amplifying circuits 41, 42 are adjusted so that $V_M = V_{max}$, and the $V_{1234}$ signal is provided with suitable time delay by a delay circuit 9, and further subsequently the $V_{1234}$ signal is squared by a square circuit 73.

If the $(V_{1234})^2$ signal squared in the square circuit 73 and the $\{V_{max} \times \text{COS } \beta\}^2$ signal are added by an adding circuit 10, it follows that $$(V_{1234})^2 + \{V_{max} \times \text{COS } \beta\}^2 = V_{max}^2$$

This becomes a constant current irrespective of the touch angle β.

That is, since the signal corresponding to the longitudinal strain forming the maximal value early in the time is delayed by the prescribed time, the maximal value is formed in the same timing as that of the signal corresponding to the bending strain and the same output can be generated irrespective of which position of the touching ball 1A touches the object.

Then the output is compared with the prescribed reference value in a comparing circuit 11, and if the output exceeds the reference value, a touch detection signal is generated.

In addition, this embodiment is not limited to the manner that the $(V_{1234})$ signal is provided with suitable time delay and then is squared, but the manner may be changed according to the spirit of this embodiment such that the $(V_{1234})$ signal is squared and then delayed.

Further, after the $(V_{1234})$ signal is provided with suitable time delay, $(V_{13})^2 + (V_{24})^2 + (V_{1234})^2$ may be produced. In this case, the same result as that described above can be obtained.

The present invention is not limited to the above-mentioned first embodiment, but includes following modifications within the scope of attaining the objects of the present invention.

Second Embodiment

Figure 8:
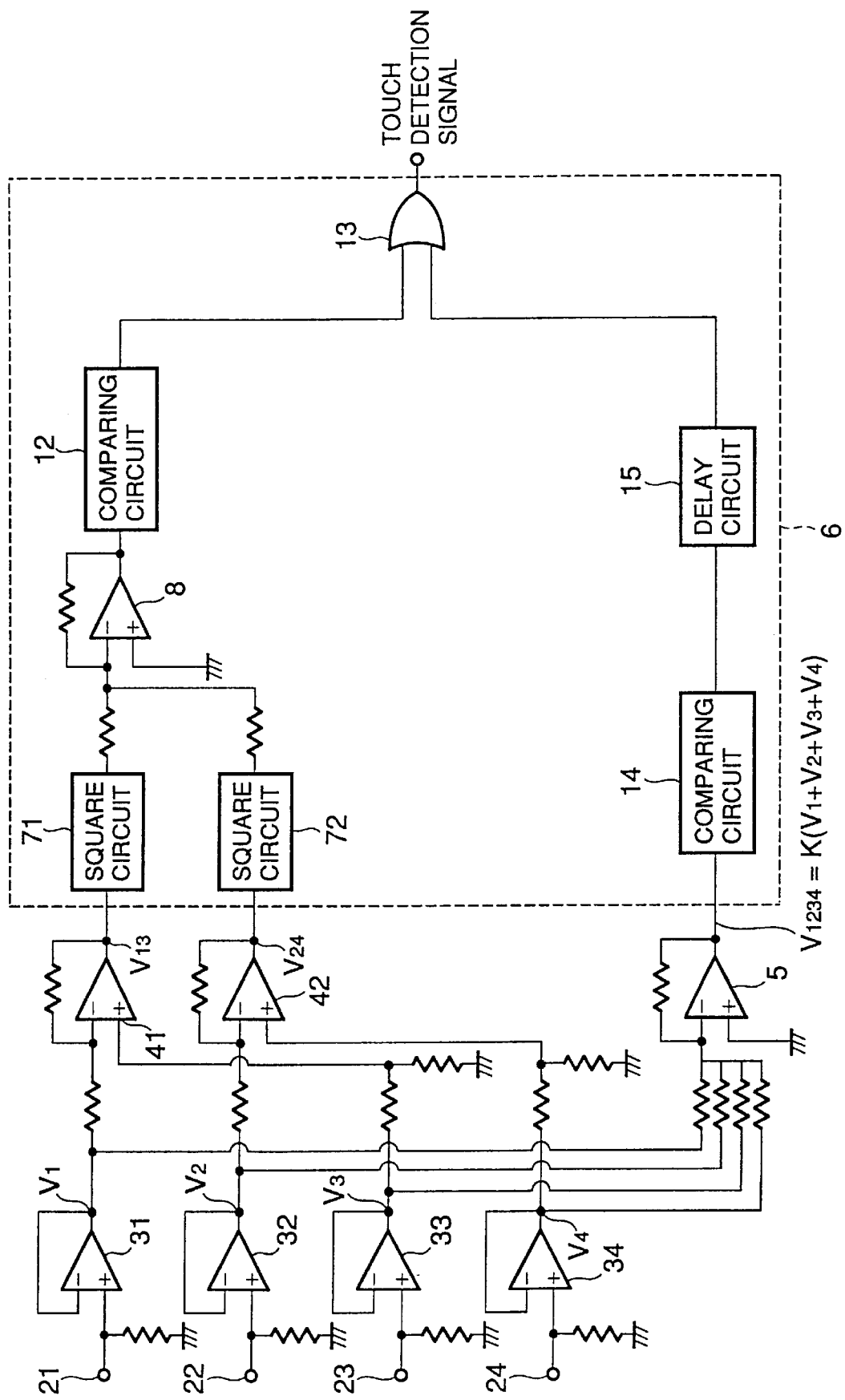
FIG. 8 shows a modification of the present invention and is a circuit diagram showing a circuit for producing a touch signal from signals outputted from the piezoelectric elements.

For example, in the present invention, as shown in FIG. 8, a touch signal probe may be configured in that signal $\{V_{max} \times \text{COS } \beta\}^2$ outputted from an adding circuit 8 is compared with the reference value in a comparing circuit 12, and if the signal exceeds the reference value, a touch detection signal is generated through an OR circuit 13, and on the other hand, sum signal $V_{1234}$ produced in the adding circuit 5 is compared with the reference value in a comparing circuit 14, and if the signal exceeds the reference value, the signal is delayed by a prescribed value in a delay circuit 15 and a touch detection signal is generated through the OR circuit 13.

Further, in FIG. 6 and FIG. 8, although the touch signal generating circuit is constituted by an analog circuit, it may be constituted by a digital circuit. Also, when precision is not required, the delay circuit 9 in FIG. 6 or the delay circuit 15 in FIG. 8 may be omitted.

Next, a second embodiment of the present invention will be described. Since a whole configuration of a non-directional touch signal probe or output waveform of a piezoelectric element of this embodiment is similar to that of the first embodiment, the detailed description shall be omitted.

Figure 9:
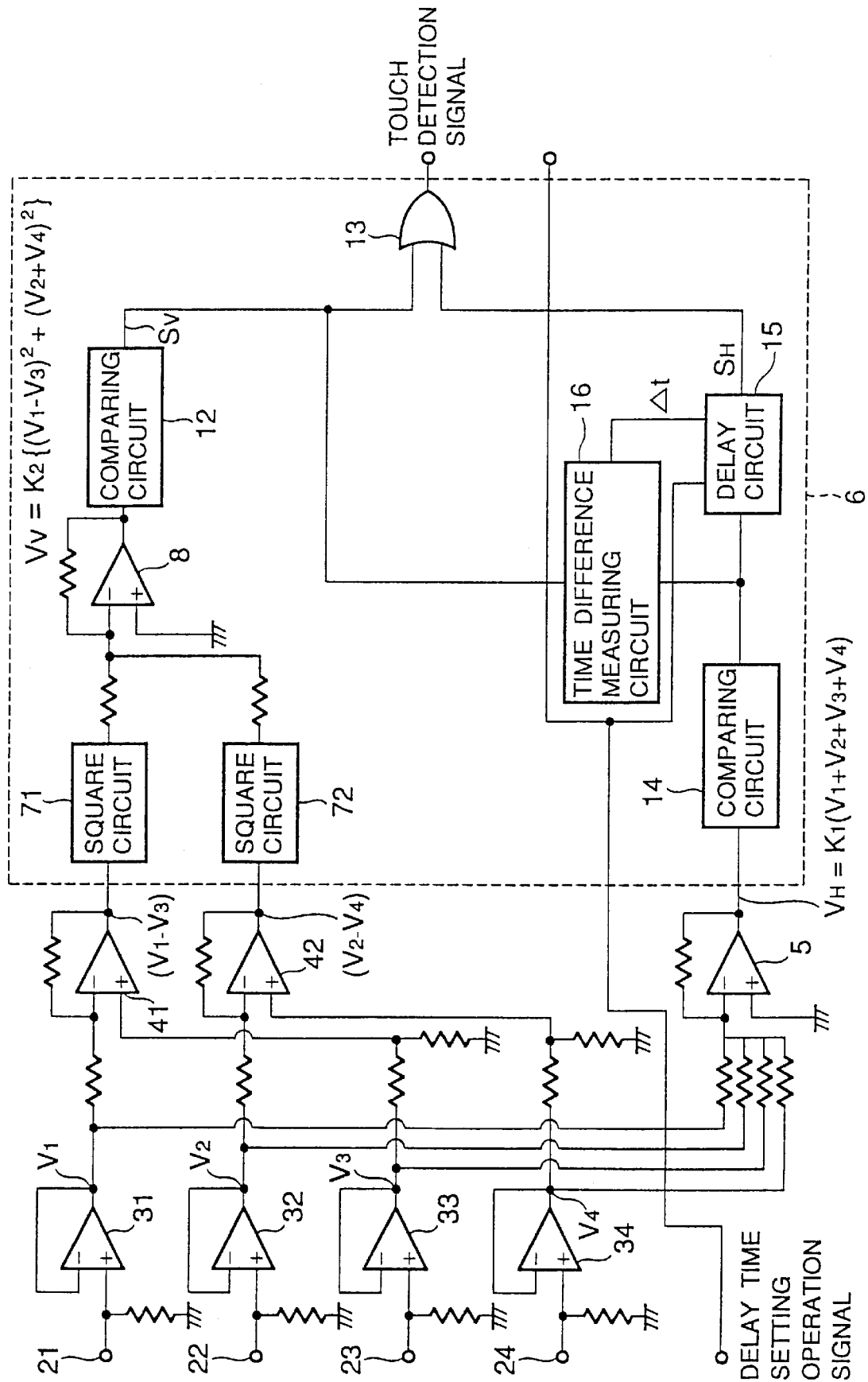
FIG. 9 is a circuit diagram of a second embodiment of the present invention showing a circuit producing a contact signal from signals outputted from piezoelectric elements.

FIG. 9 is a circuit diagram of the second embodiment where touch detection signals are generated by outputs from four piezoelectric elements 21~24.

In FIG. 9, signals outputted from each of the piezoelectric elements 21~24 are amplified in amplifying circuits 31~34 and made $V_1 \sim V_4$, and then the difference $(V_1 - V_3)$ of the signals $V_1$, $V_3$ from the piezoelectric elements 21, 23 in relation of the front and rear sides to each other is produced by a differential amplifying circuit 41, and the difference $(V_2 - V_4)$ of the signals $V_2$, $V_4$ outputted from the piezoelectric elements 22, 24 on opposite sides from each other is produced by a differential amplifying circuit 42.

Here, the differences $(V_1 - V_3)$, $(V_2 - V_4)$ of the output signals of the piezoelectric elements 21, 23 (22, 24) are produced in order that the lateral strain component is obtained.

The sum of the signals $V_1 \sim V_4$ outputted from the piezoelectric elements 21~24 and amplified in the amplifying circuits 31~34 is produced by the adding circuit 5. The sum of the four piezoelectric elements 21~24 is produced in order that the lateral strain component acting on the stylus axis is removed and the longitudinal strain component acting in the stylus axis direction is obtained. In this embodiment, however, when the longitudinal strain component is obtained, the operation is not limited to obtain the sum of the output signals of all four piezoelectric elements 21~24, but the sum of the output signals from the two piezoelectric elements 21, 23 or the two piezoelectric elements 22, 24 being on opposite sides from each other may be produced.

A touch detection signal is produced by a touch signal detecting circuit 6 from the first touch signal produced in the differential amplifying circuits 41, 42 and the second touch signal produced in the adding circuit 5.

When $K_1$ is assumed to be an amplification factor, the sum signal $V_H$ produced by the adding circuit 5 is determined in the following formula.

$$V_H = K_1(V_1 + V_2 + V_3 + V_4)$$

The signals produced in the differential amplifying circuits 41, 42 are squared in squaring circuits 71, 72, respectively, and then added in an adding circuit 8 and become signal $V_V$. The signal $V_V$ is a signal corresponding to the lateral strain component along the orthogonal direction to the stylus axis. Here, the signals are squared and added in order that the output signals from the piezoelectric elements 21, 23 (22, 24) being different in the mounting angle by 90 degrees are made constant irrespective of the angle Θ.

When $K_2$ is assumed to be an amplification factor, the signal $V_V$ produced in the adding circuit 8 is determined in following formula.

$$V_V = K_2\{(V_1 - V_3)^2 + (V_2 - V_4)^2\}$$

In general, the timing of forming the maximal value of the signal $V_V$ and the timing of forming the maximal value of the signal $V_H$ are different. That is, since the longitudinal rigidity is higher than the bending rigidity, the signal $V_H$ is early in the time. Consequently, the signal $V_H$ corresponding to the longitudinal strain component forming the maximal value early in the time is delayed by the prescribed time, thereby the maximal value is formed in the same timing as that of the signal corresponding to the lateral strain component so that the same output can be generated whatever position of the touching ball 1A touches the object.

More specifically, the signal $V_H$ produced by the adding circuit is compared with the reference value in the comparing circuit 14, and when the signal exceeds the reference value, the outputted first detection signal $S_H$ is delayed by the prescribed time in the delay circuit 15 and then generated through the OR circuit 13.

Also the signal $V_V$ operated by the adding circuit 8 is compared with the reference value in the comparing circuit 12, and when the signal exceeds the reference value, the outputted second detection signal $S_V$ is generated through the OR circuit 13.

In this embodiment, angle β within the plane including the stylus axis (refer to FIG. 7) is made a prescribed angle, for example, 45 degrees, and the stylus 1 is made to touch the object to be measured. Then the time difference Δt between the time of generating the first detection signal $S_H$ and the time of generating the second detection signal $S_V$ is measured by a time difference measuring circuit 16. Here, the touch angle β of the stylus 1 to the object is not limited to 45 degrees. It may be any angle producing two components, the longitudinal vibration component in the stylus axis direction and the lateral vibration component in the orthogonal direction to the axis direction. In theory, it may be any angle other than zero or 90 degrees. In practice, however, since the time of generating respective vibration components must be measured, the amplitude of respective vibration components must be of a measurable amount. Therefore the touch angle is preferably 45 degrees.

Figure 10:
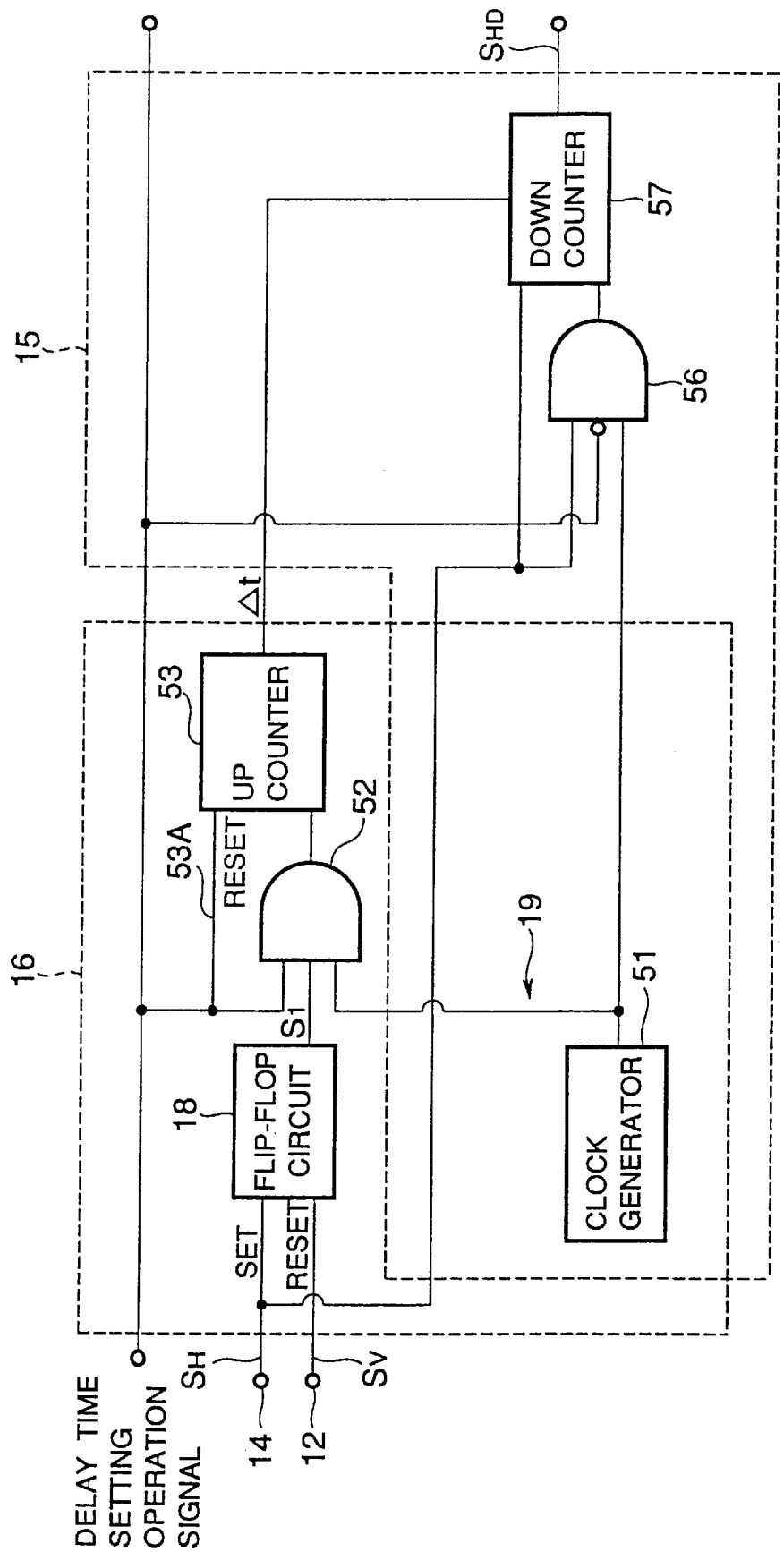
FIG. 10 is a circuit diagram showing the constitution of a delay circuit and a time difference measuring circuit.

The time difference detecting circuit 16 performs the delay time setting operation which sets the time difference Δt as the delay time to the delay circuit 15 every time the stylus 1 is exchanged. As shown in FIG. 10, the time difference measuring circuit 16 is provided with a flip-flop circuit 18 which outputs 5 output signals while the first detection signal $S_H$ is generated until the second detection signal $S_V$ is generated, and a time measuring circuit 19 which measures the time of outputting of the output signals in the flip-flop circuit 18 and produces the time difference Δt.

Figure 11:
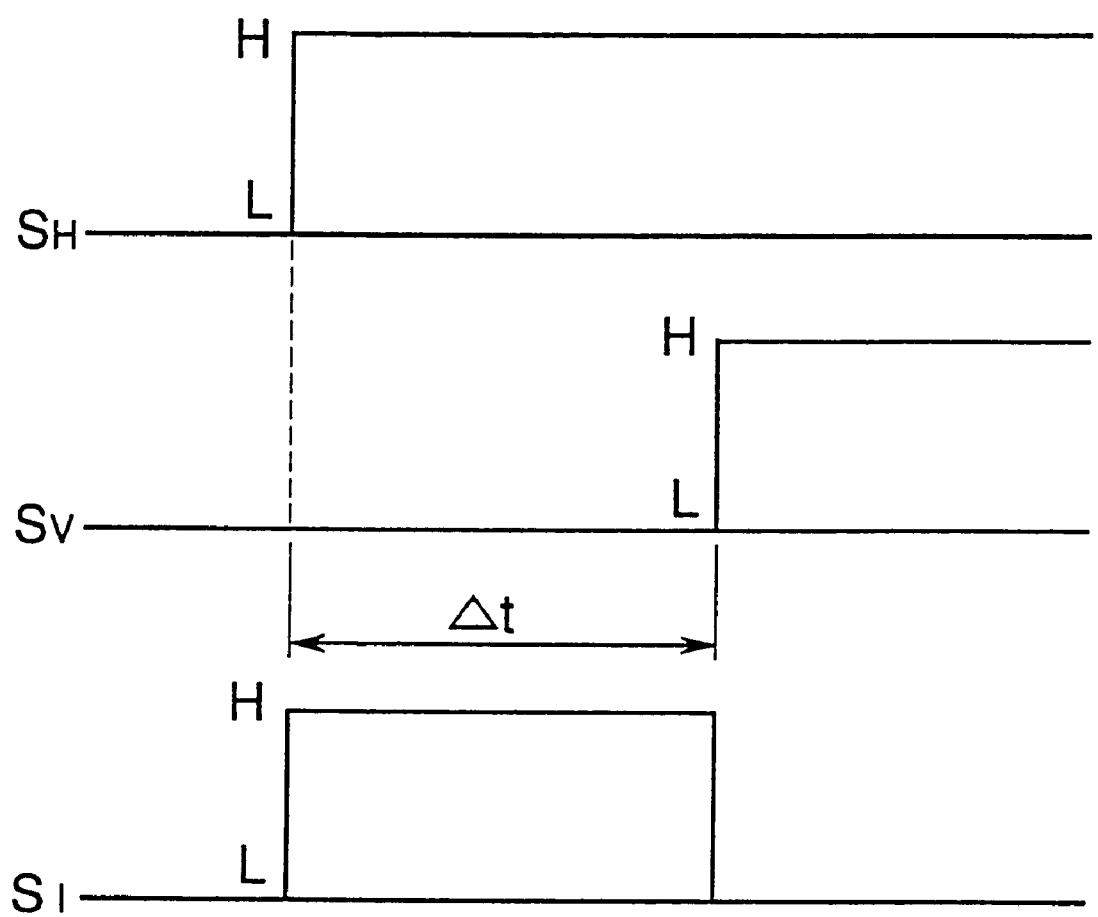
FIG. 11 is a graph showing the relation of first detection signal $S_H$, second detection signal $S_V$ and output signal $S_1$ of a flip-flop circuit.

The flip-flop circuit 18 is a reset/set flip-flop (RS-FF) where a comparing circuit 14 with the first detection signal $S_H$ sent thereto is connected to a set terminal and a comparing circuit 12 with the second detection signal $S_V$ sent thereto is connected to a reset terminal, and the output signal $S_1$ becomes H level while the first detection signal $S_H$ becomes H level until the second detection signal $S_V$ becomes H level at which time $S_1$ becomes L level (refer to FIG. 11).

The time measuring circuit 19 comprises a clock generator 51, an AND circuit 52 which receives a signal of the clock generator 51, the output signal $S_1$ of the flip-flop circuit 18 and the delay time setting operation signal, and outputs a signal, and an up counter 53 which receives a signal from the AND circuit 52 and produces the time difference Δt from the time that the output signal $S_1$ is at the H level.

The up counter 53 is provided with a reset terminal 53A, which is connected to a control unit (not shown) of a coordinate measuring machine. When the delay time setting operation is to be performed, if the delay time setting operation signal is outputted, the up counter 53 is reset and Δt is counted.

Also, the delay circuit 15 comprises an AND circuit 56 which receives a signal from the clock generator 51, the first detection signal $S_H$ and an inverted signal of the delay time setting operation signal, and outputs a signal, and a down counter 57 where the first detection signal $S_H$ is received and the time difference Δt is loaded from the up counter 53 and a clock signal is inputted and the down count is started.

In the down counter 57, when the value becomes zero, a borrow signal is outputted, and this signal is used as signal $S_{HD}$ that the first detection signal $S_H$ is delayed by the time difference Δt.

In this embodiment, the delay circuit 15 and the time difference measuring circuit 16 are not limited to that as above described. For example, the clock generator 51 need not be made common with the delay circuit 15 and the time difference measuring circuit 16 but may be constituted separately.

Accordingly in this embodiment, the touch detection circuit 6 is constituted by the time difference measuring circuit 16 measuring the time difference between the time of generating the first detection signal $S_H$ and the time of generating the second detection signal $S_V$ and the delay circuit 15 for delaying the first detection signal $S_H$ by the set delay time Δt when the disjunction of the first detection signal $S_H$ and the second detection signal $S_V$ is determined, and the time difference measuring circuit 16 performs the delay time setting operation of setting the time difference Δt as the delay time to the delay circuit 15 every time the stylus 1 is exchanged. Before the measurement, the touching ball 1A of the installed stylus 1 touches the object to be measured at a prescribed angle, for example, 45 degrees and the time difference Δt between the time of generating the first detection signal $S_H$ and the time of generating the second detection signal $S_V$ in this case is determined by the time difference measuring circuit, thereby even if the shape of the installed stylus 1 is varied, since the time difference t between the first detection signal $S_H$ and the second detection signal $S_V$ is corrected in each stylus 1, the measurement with high precision can be performed without the direction dependent property.

Further, since the delay time setting operation and the usual measuring operation are distinguished by the delay time setting operation signal, an incorrect time difference Δt is not used. Therefore the high precision of the measurement is secured.

In addition, the present invention is not limited to the above-mentioned embodiments, but includes following modifications within the scope attaining the foregoing objects of the present invention.

Figure 12:
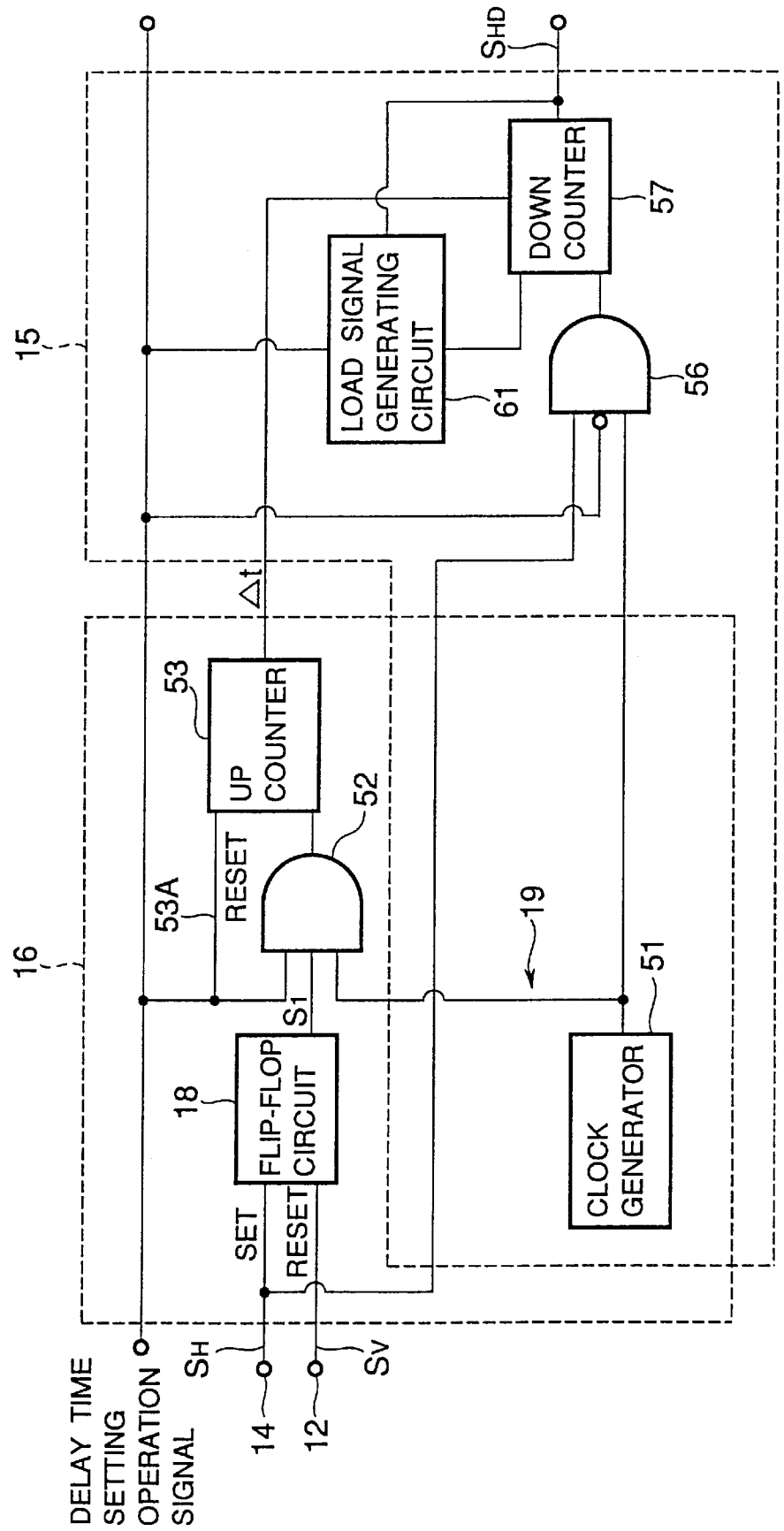
FIG. 12 is a diagram showing a modification of the second embodiment and corresponding to FIG. 10.

For example, in the embodiment as shown in FIG. 12, a load signal generating circuit 61 may be included. The load signal generating circuit 61 generates a load signal to the down counter 57 after lapse of a prescribed time from outputting the signal $S_{HD}$ or after finishing the delay time setting operation.

Figure 13:
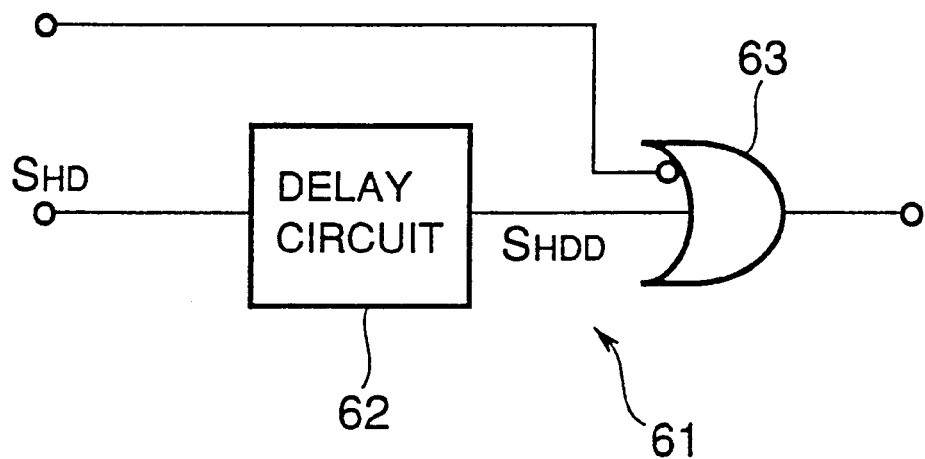
FIG. 13 is a circuit diagram showing a load signal generating circuit constituting the modification.

The load signal generating circuit 61 as shown in FIG. 13 comprises a delay circuit 62 generating a signal $S_{HDD}$ of the signal $S_{HD}$ delayed by a prescribed time and an OR circuit 63 generating the disjunction of the signal $S_{HDD}$ and the inverted signal of the delay time setting operation signal.

Figure 14A:
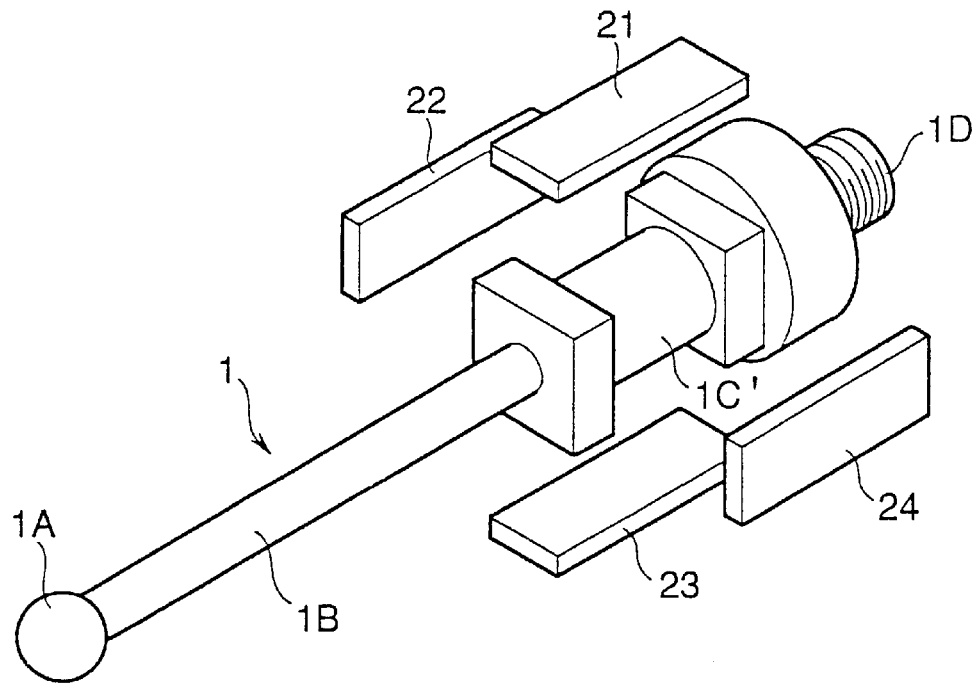
Figure 14B:
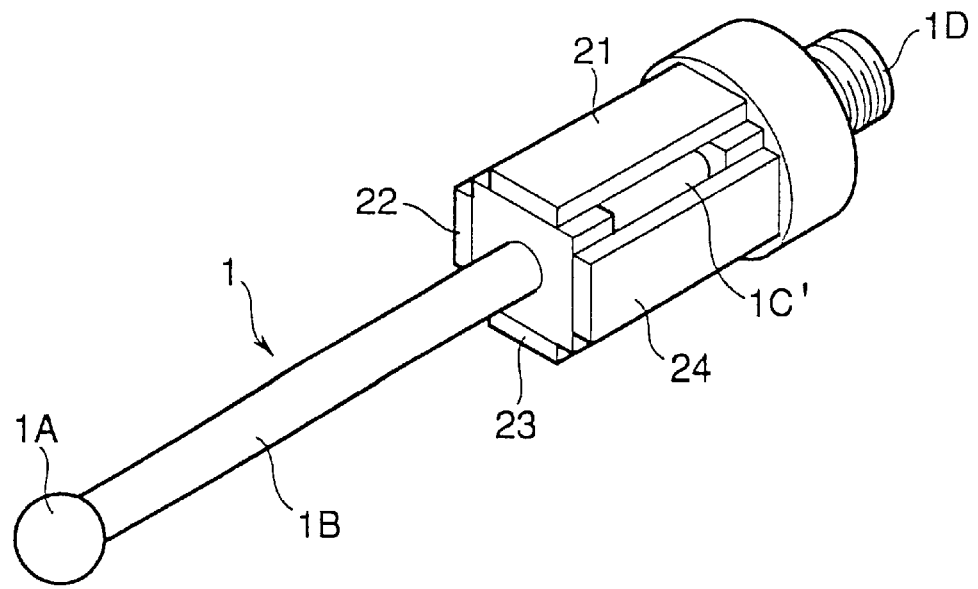

Also in the present invention, in order to increase the output from the piezoelectric elements 21~24, as shown in FIGS. 14A and 14B, the center part of the piezoelectric element support part 1C' is reduced in section, and both end parts of the piezoelectric elements 21~24 are supported and fixed to both end parts of the piezoelectric element support part 1C. A gap is formed between the center part and the piezoelectric element support part 1C. In this case, the piezoelectric element support part 1C, and the cross section of both end parts supporting the piezoelectric elements 21~24 are made square.

In this structure, since rigidity of the piezoelectric element support part 1C' is lower than that of the piezoelectric element support part 1C in FIG. 1, the deformation of the piezoelectric elements 21~24 increases. Therefore, the output of the piezoelectric elements 21~24 becomes larger, and the measurement precision can be improved.

Figure 15A:
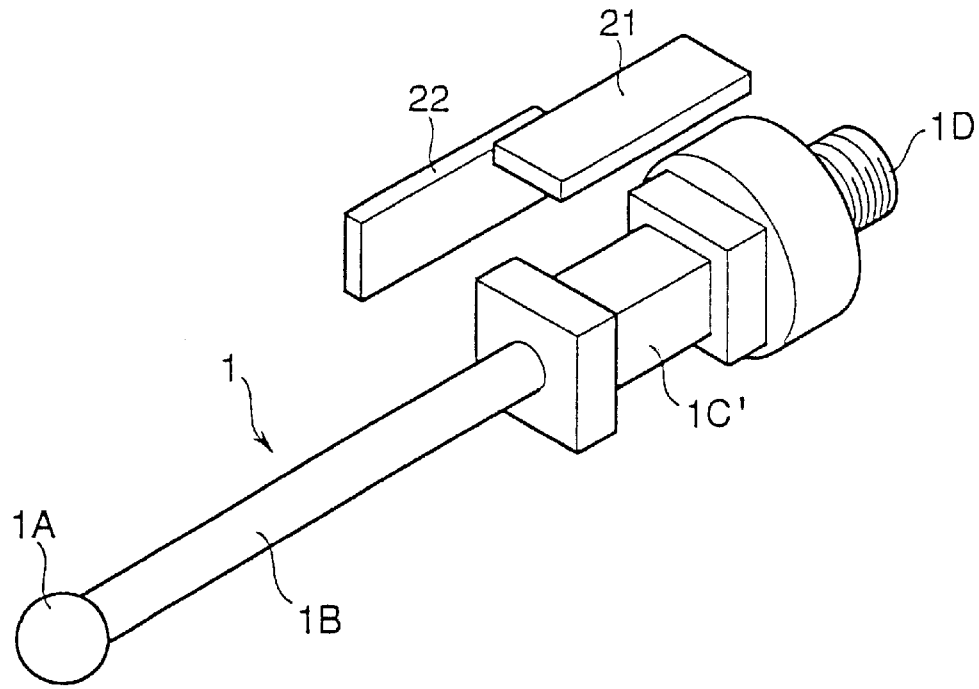
Figure 15B:
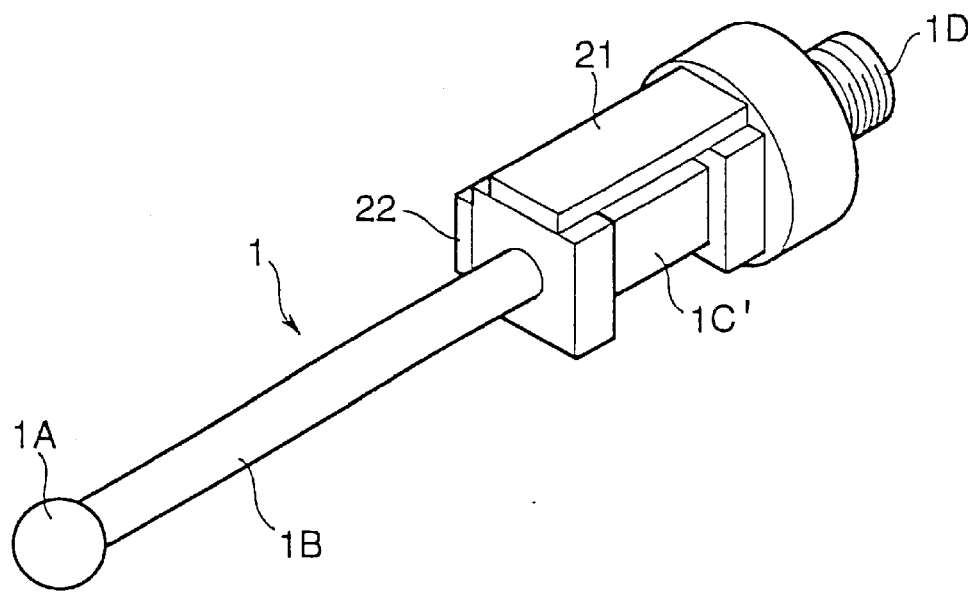

Further in the above-mentioned embodiments, although the description has been performed in the case that the four piezoelectric elements 21~24 are installed, in the present invention as shown in FIGS. 15A and 15B, two piezoelectric elements 21, 22 may be fixed to two adjacent side surfaces of the piezoelectric element support part 1C. In this case, in the touch signal producing circuit in FIG. 6, signals outputted from the piezoelectric elements 21, 22 need not be amplified differentially. But since the signal component includes not only the bending strain component but also the longitudinal structure component, the circuit may be said to be a simple circuit. Consequently when the direction orthogonal to the stylus axis touches the object to be measured, the direction dependent property is not generated in the Θ direction. The direction dependent property remains in the β direction. However, this is not disadvantageous in a simple measurement.

Figure 16:
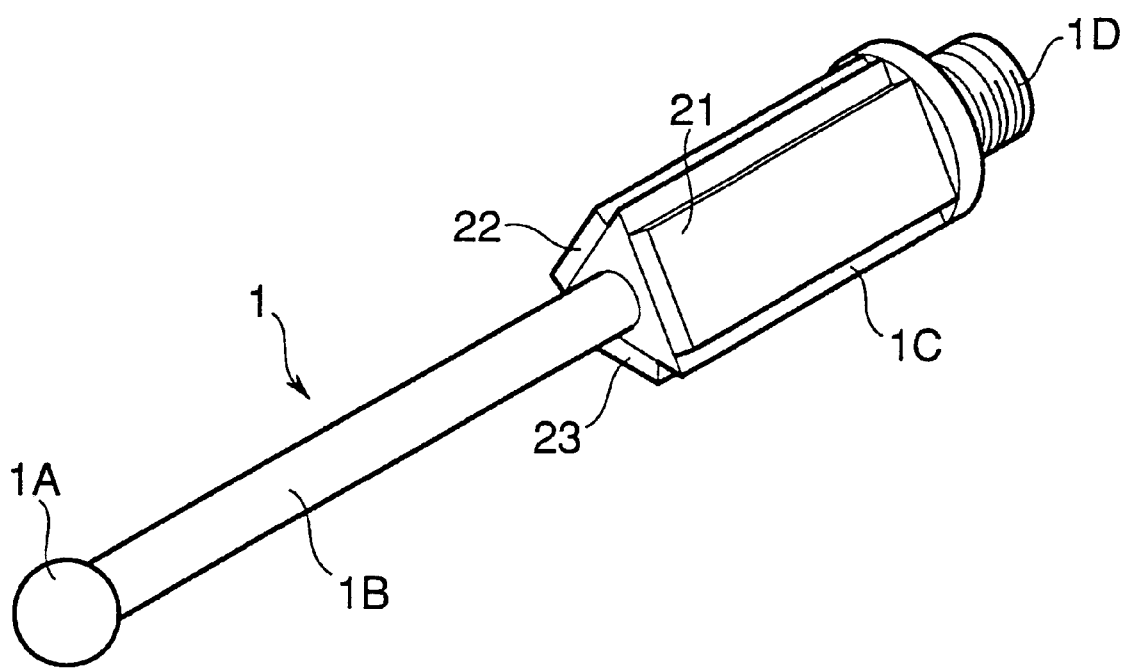
FIG. 16 is a perspective view showing a touch probe of the present invention (an example of the sectional shape of the piezoelectric element support part being different)

Also in the present invention, as shown in FIG. 16, the cross section of the piezoelectric element support part 1C may be made a regular triangle and all three piezoelectric elements 21~23 may be mounted on each side surface of the piezoelectric element 1C. Further the cross-section of the piezoelectric element support part 1C may be made a regular pentagon, regular hexagon or the like.

When the cross section of the piezoelectric element support part 1C is made a regular triangle, if the outputs of the three piezoelectric elements 21~23 are squared and added, in the case that the touching ball touches the object to be measured from the direction orthogonal to the stylus axis, constant output not depending on the angle Θ, namely, bending strain component, can be obtained. If outputs of the three piezoelectric elements 21~23 are added, longitudinal strain component can be obtained. But, in the case that the touching ball touches the object from the direction not orthogonal to the stylus axis, the direction dependent property remains in the β direction. However, this is not disadvantageous for simple measurements.

Figure 17:
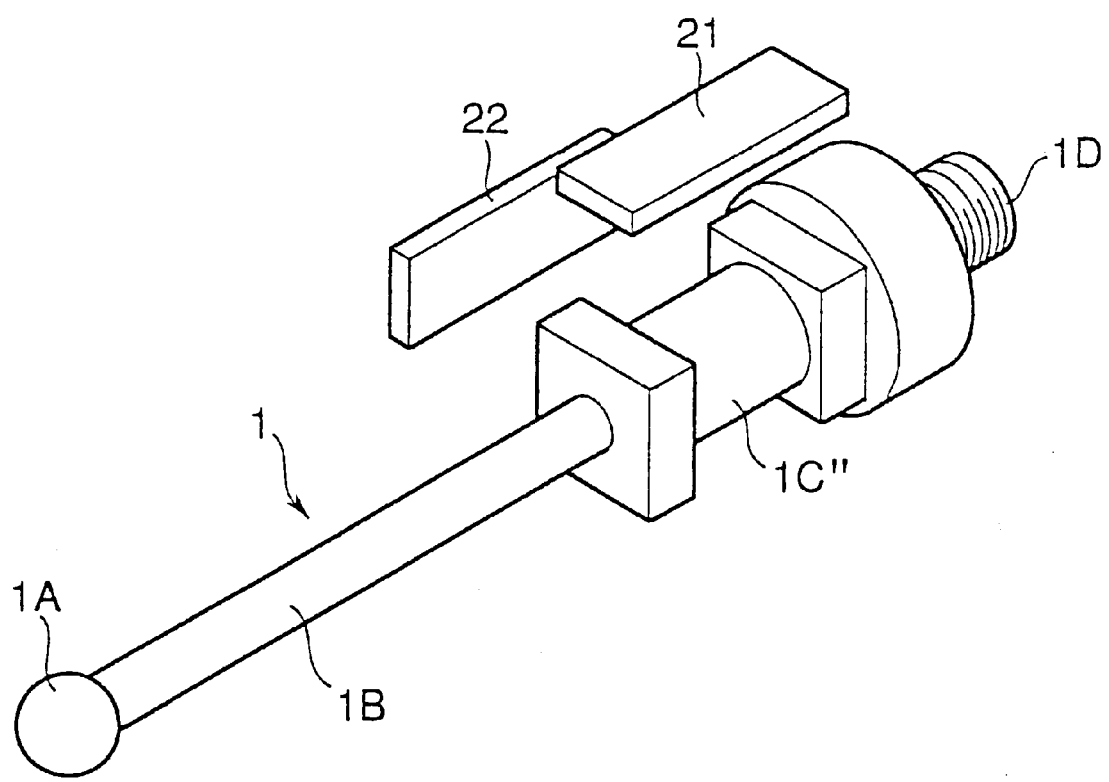
FIG. 17 is an exploded perspective view showing a touch probe of the present invention (an example of the shape of the center part of the piezoelectric element support part being different).

Further, although the above description has been performed in the case that the cross section of the center part of the piezoelectric element support part 1C is made a regular polygon, in the present invention as shown in FIG. 17, the center part of the piezoelectric element support part 1C'' may be formed in circular cross section. That is, in the present invention, in the piezoelectric element support part 1C', a part supporting directly the piezoelectric elements 21~24 may be provided with a cross section of a regular polygon, and shape of a part not touching the piezoelectric elements 21~24 is not limited.

What is claimed is:

1. A non-directional touch signal probe comprising:
    a pole-shaped stylus with its top end portion having a touching part for touching an object to be measured;
    detecting elements arranged on said stylus for detecting that said touching part touches the object;
    said stylus having a detecting element support section for supporting and fixing said detecting elements;
    said detecting element support section being a regular polygonal body having a plurality of side surfaces and cross section orthogonal to the stylus axis of a regular polygon, and said detecting elements being mounted on at least two surfaces among respective side surfaces of the regular polygonal body;
    means for processing signals outputted from said detecting elements to produce a touch detection signal such that the touch signal is produced with the same delay time after contact regardless of the direction of contact with the objects; and
    said detecting element support section having a reduced center section and end parts with a cross section of a regular polygon, said detecting elements supported by said end parts and there being a gap formed between the detecting elements and the center section of said support part.

2. A non-directional touch signal probe as set forth in claim 1, wherein said detecting elements are piezoelectric elements.

3. A non-directional touch signal probe as set forth in claim 2, wherein said detecting elements are strain gauges.

4. A non-directional touch signal probe as set forth in claim 2, wherein said means for processing the signals outputted from said detecting elements comprises is any of sum, subtraction, square, constant multiplication and delay or combination thereof.

5. A non-directional touch signal probe as set forth in claim 1,
    wherein cross section of said detecting element support part is made square and the detecting elements being four in the total number are mounted on each side surface of the detecting element support part; and
    a touch detection signal is generated from two difference signals outputted from two sets of detecting elements positioned on opposite sides from each other with respect to said detecting element support part among these four detecting elements and from the sum signals outputted from all four detecting elements or the sum signals from the two detecting elements positioned on opposite sides from each other.

6. A non-directional touch signal probe as set forth in claim 5,
    wherein a first touch signal is produced from the two difference signals outputted from the two sets of detecting elements positioned on opposite sides from each other, and a second touch signal is produced from sum signals outputted from the four detecting elements or from sum signals outputted from the two detecting elements positioned on opposite sides from each other; and
    the second touch signal is delayed by a prescribed time and then a touch detection signal is generated from either of the first touch signal or the delayed second touch signal.

7. A non-directional touch signal probe as set forth in claim 6,
    wherein the first detection signal is produced when two difference signals outputted from two sets of detection elements positioned in relation to the front and rear sides are squared and summed, respectively, and the square sum signal exceeds the prescribed reference value; and
    the second detection signal is produced when the sum signal outputted from the four detection elements or sum signal outputted from two detection elements positioned in relation to the front and rear sides exceeds the prescribed reference value.

8. A non-directional touch signal probe as set forth in claim 5,
    wherein a first signal is obtained in that the sum of signals outputted from each of the detection elements or the sum of signals outputted from two detection elements positioned on opposite sides are adjusted in amplitude and delayed by a prescribed time;

two difference signals are outputted from the detection elements positioned on opposite sides; and said first signal and said two difference signals, thus three signals in total, are squared and summed, and a touch detection signal is generated using signals produced from said three signals.

9. A non-directional touch signal probe as set forth in claim 1, wherein said detecting elements are in planar rectangular form with the longitudinal direction of the detecting elements in parallel to the stylus axis.

10. A non-directional touch signal probe as set forth in claim 1, wherein the cross section of the detecting element support part is made regular triangle.

11. A non-directional touch signal probe as set forth in claim 1, wherein a cross-section of the center section of the detecting element support part is made a regular polygon the same shape but reduced in cross section as that of both end parts.

12. A non-directional touch signal probe as set forth in claim 1, wherein the cross section of the center section of the detecting element support part is made circular.

13. A non-directional touch signal probe as set forth in claim 1, wherein the cross section of the detecting element support part is made square and two detecting elements are fixed to two side surfaces adjacent to each other.

\* \* \* \* \*

UNITED STATES PATENT AND TRADEMARK OFFICE
CERTIFICATE OF CORRECTION

PATENT NO. : 6,215,225 B1
DATED : April 10, 2001
INVENTOR(S) : Nobuhiro Ishikawa et al.

Page 1 of 1

It is certified that error appears in the above-identified patent and that said Letters Patent is hereby corrected as shown below:

<u>Column 5,</u>
Line 45, "At" should read -- $\Delta$t --.

<u>Column 11,</u>
Line 37, after "which outputs" delete "5".

<u>Column 14, claim 4,</u>
Line 18, after "comprises" delete "is".

Signed and Sealed this

Twenty-seventh Day of November, 2001

*Attest:*

*Attesting Officer*

NICHOLAS P. GODICI
*Acting Director of the United States Patent and Trademark Office*